United States Patent [19]

Berry et al.

[11] Patent Number: 4,522,726

[45] Date of Patent: Jun. 11, 1985

[54] ADVANCED SEPARATION DEVICE AND METHOD

[75] Inventors: W. Wess Berry, Brandon, Fla.; Rae A. Schmeda, Littleton; Holly S. Kibler, Boulder, both of Colo.

[73] Assignee: Progress Equities Incorporated, St. Petersburg, Fla.

[21] Appl. No.: 635,837

[22] Filed: Jul. 30, 1984

[51] Int. Cl.³ .............................................. B01D 15/02
[52] U.S. Cl. ....................................... 210/660; 55/78; 55/99; 55/181; 55/390; 55/474; 210/784; 210/806; 210/264; 210/267; 210/404
[58] Field of Search ...................... 55/78, 99, 181, 390, 55/474; 210/657, 660, 677, 780, 784, 790, 806, 264, 267, 404

[56] References Cited

U.S. PATENT DOCUMENTS

| | | | |
|---|---|---|---|
| 2,617,986 | 11/1952 | Miller | 210/267 |
| 2,639,000 | 5/1953 | Edwards | 210/404 |
| 2,985,589 | 5/1961 | Broughton et al. | 210/264 |
| 3,971,842 | 7/1976 | Ewbank | 210/267 |
| 4,032,442 | 6/1977 | Peterson | 210/780 |
| 4,124,508 | 11/1978 | Capetanopoulos | 210/218 |
| 4,155,846 | 5/1979 | Novak et al. | 210/264 |

Primary Examiner—Ivars Cintins
Attorney, Agent, or Firm—Burns, Doane, Swecker & Mathis

[57] ABSTRACT

A separation device designed to effect substantially continuous separation and/or fractionation operations as in, for example, ion exchange or other solid-fluid contacting systems. Also disclosed and claimed is a method for effecting such continuous treatment of plural fluid streams. The device is characterized by its construction to permit treatment of plural streams simultaneously and continuously. Fixed inlet and outlet nipples are provided for introducing and removing the fluid streams, and the inlet and outlet nipples are operatively interconnected by a rotating member which is internally divided into a plurality of working sections. By virtue of the rotatable construction of that member and its plural working sections, discrete fluid streams may be treated separately, yet simultaneously. Furthermore, the device of this invention is such that fluid flow in either of two directions may take place through each of the working sections dependent only upon predetermined process parameters.

3 Claims, 2 Drawing Figures

ADVANCED SEPARATION DEVICE AND METHOD

BACKGROUND OF THE INVENTION

1. Field of the Invention

The present invention is directed to an advanced separation device for the treatment of fluid streams whereby one may accomplish, for example, ion exchange and/or other solid-fluid contacting operations. Also disclosed and claimed is a novel method for effecting continuous treatment of plural fluid streams as well as a variety of proposed commercial uses for the advanced separation device.

2. Description of the Prior Art

A review of prior patent literature as well as a survey of presently available devices confirms that today's commercial ion exchange and similar devices, almost without exception, operate with fixed or pulsed beds. With fixed-bed systems, several devices are required to effect separation and to allow a reasonably continuous flow of the feed solutions. Thus, when a fixed bed of material is spent, that unit must be removed from the operating circuit and regenerated. This necessarily results in considerable downtime and usually requires complicated and expensive support systems. In similar fashion, while current pulsed bed systems are often referred to as being "continuous," they are in reality a hybrid batch system. In pulsed bed units, the flow of fluid is periodically stopped while resin or absorbent material is removed or pulsed from the system. The absorbent is then transferred to another section for washing, regeneration, and the like. While downtime of pulse bed systems is usually less than that of fixed bed systems, the mechanical aspects of their support systems are usually quite complicated and expensive.

Considering prior art as disclosed and taught in issued U.S. Patents, U.S. Pat. No. 3,396,850 to Kuvat, et al., discloses an apparatus for the separation and fractionation of material dissolved or suspended in a liquid. According to the disclosure of that patent, the suspension to be treated is admitted into an inlet chamber and then passed into a bundle of separation tubes as a series of suspension "plugs" separated by a gas. Both the inlet chamber and the bundle of tubes rotate, and separated fractions are collected by a stationary collector downstream of the tube bundle. Kuvat discloses no means for simultaneously treating plural streams; no means for any form of regeneration or purging any section of this device while continuing the separation process; and no means for passing material through this device in any direction other than from the inlet, through the bundle of tubes into the collector.

U.S. Pat. No. 4,124,508 to Capetanopoulos discloses a gas transfer system for dissolving a gas or other compressible fluid in a relatively non-compressible liquid. According to this patent a raw influent is admitted into a first chamber of a rotating member. As that member rotates, the raw influent is treated with a pressurized gas while a second quantity of raw influent is admitted into a second chamber of the rotating member. Then, with further rotation, the gas-treated influent is removed as effluent which has been treated. Continuous rotation of the three-chamber member permits substantially continuous treatment of raw influent by pressurized gas in predetermined batch quantities on a substantially continuous basis. Nevertheless, the Capetanopoulos system would not be suitable for ion exchange or solid-liquid contacting operations for the reason that fluid flow through the system is unidirectional and, if ion exchange separation were to be attempted with this system, regeneration would require stopping the flow of influent during the regeneration process.

Other prior patent literature which is believed to be pertinent to the scope of this invention concerns the art of self-cleaning filter elements. Such devices are deemed pertinent in that they disclose filter systems which can be cleaned, or backwashed, by reversing flow through isolated, predetermined filter segments. Examples of such devices are found in the following U.S. Pat. Nos.

Olgard, 3,615,020
Moatti, 3,739,914
Moatti, 3,944,488
Peterson, 4,032,442
Kaminsky, et al., 4,085,051.

However, a review of these patents confirms that they relate to filter systems and processes, and would not be useful to effect continuous ion exchange and/or solid-liquid contacting operations as would the device of this invention.

It is, therefore, apparent that there is a great need in the art for a truly continuous separation device which may be utilized efficiently and economically in a variety of commercial and analytical processes. The construction and utilization of such an advanced separation device would permit all process functions, such as absorption, regeneration, and the like to be conducted simultaneously in various working sections without stopping the flow of fluid to be treated.

SUMMARY OF THE INVENTION

The present invention concerns not only an advanced separation device for the treatment of fluid streams whereby plural streams may be simultaneously and continuously treated, but also relates to a method for effecting such continuous treatment of plural fluid streams. The advanced separation device of this invention is perhaps best characterized by its construction to comprise a rotating separator body including a plurality of distinct working compartments therein disposed in fluid communicating relation between a fixed feed box at one end and a fixed discharge box at the other end thereof. The method for effecting continuous treatment of plural fluid streams is similarly characterized by process steps comprising the introduction of fluid streams into and out of distinct working compartments of the separator body in predetermined fashion made possible by the rotation of the body. Accordingly, plural streams may be treated and individual process steps may be accomplished in a continuous fashion. Furthermore, as will be set forth in greater detail below, the direction of fluid flow through individual working compartments of the separator body may be varied in accord with predetermined process parameters.

It is, of course, to be understood that in the following summary as well as in the drawing figures and the detailed description set forth hereinafter, a preferred embodiment for the advanced separation device and the method for effecting continuous treatment of plural fluid streams is set forth. The scope of the present invention is not to be limited to these preferred embodiments, for design and engineering alterations could be made in response both to the number of fluid streams to be treated and to the type of treatments required by a process system. Such design and engineering alterations are deemed to fall within the scope of the present invention.

The advanced separation device of this invention comprises a feed box having a plurality of feed box sections formed therein and including means for introducing a fluid stream into each one of the feed box sections. An upper timing crown is fixed to the feed box downstream of the means for introducing and comprises a plurality of feed slots formed therethrough with each of the feed slots being in fluid communicating relation to a corresponding feed box section. As will be explained in greater detail hereinafter, the feed box and its upper timing crown are maintained in a fixed relationship.

An upper distribution crown is movably disposed in juxtaposition downstream of the upper timing crown and comprises a plurality of upper distribution slots formed therethrough. At least one of the upper distribution slots is disposable into fluid communicating relation with at least one of the feed slots. A distribution box defining a plurality of distribution compartments therein is fixed to the upper distribution crown downstream thereof whereby each one of the distribution compartments is in fluid communicating relation to a corresponding one of the upper distribution slots. The distribution box further comprises outlet means for each of the distribution compartments downstream of the upper distribution crown. A separator body defining a plurality of working compartments and including means for receiving a fluid stream into each one of the working compartments is disposed downstream of the distribution box and each of its means for receiving is connected in fluid communicating relation to a corresponding one of the distribution compartment outlet means. A discharge means for each working compartment of the separator body is provided downstream of the means for receiving.

A collection box also defining a plurality of collection compartments therein and including means for collecting a fluid stream into each one of its collection compartments is disposed downstream of the separator body, and each means for collecting is disposed in fluid communicating relation to a corresponding one of the separator body discharge means. A lower distribution crown is fixed to the collection box downstream of the means for collecting and comprises a plurality of lower distribution slots formed therethrough with each of the distribution slots being in flufuid communicating relation to a corresponding one of the collection compartments. A lower timing crown is disposed in juxtaposition downstream of the lower distribution crown in fixed, non-rotating relation thereto. The lower timing crown comprises a plurality of discharge slots formed therethrough, at least one of said discharge slots being in fluid communicating relation to at least one of the lower distribution slots.

A discharge box defining a plurality of discharge sections is fixed downstream of the lower timing crown whereby each of the discharge sections is in fluid communicating relation to a corresponding one of the discharge slots. The discharge box further comprises means for withdrawing a fluid stream from each of the discharge sections. Finally, drive means are operatively connected to the device whereby the upper distribution crown, the distribution box, the separator body, the collection box and the lower distribution crown may be rotated with respect to the feed box and its upper timing crown and with respect to the lower timing crown and the discharge box.

The method of this invention may be generally described as introducing discrete fluid streams into individual treatment sections of the separator body while rotating the separator body to permit withdrawal of resulting treated streams for end use or for subsequent introduction into remaining treatment sections of the separator body. It is to be understood that fluid flow may take place in both "up" and "down" directions through individual treatment sections of the separator body, and that the individual treatment sections may contain materials for performing different process steps within each section. Furthermore, the fluid streams may be either liquids or gasses, may be intended for treatment of material contained within the stream, or may be utilized for regenerating/recharging individual treatment sections.

Because the separator body may rotate continuously to present individual treatment sections in a predetermined fashion, the method of this invention may be modified and utilized for performing a great variety of procedures requiring ion exchange and/or solid-liquid contacting operations. Examples of specific procedures are presented hereinafter.

The invention accordingly comprises the several steps and the relation of one or more of such steps with respect to each of the others and the apparatus embodying features of construction, combinations of elements and arrangements of parts which are adapted to effect such steps, all as exemplified in the following detailed description, and the scope of the invention will be indicated in the claims.

BRIEF DESCRIPTION OF THE DRAWINGS

For a full understanding of the nature and objects of the invention, reference should be had to the following detailed description taken in connection with the accompanying drawings, in which.

Similar reference characters refer to similar parts throughout the several views of the drawings.

DETAILED DESCRIPTION

Figure 1:
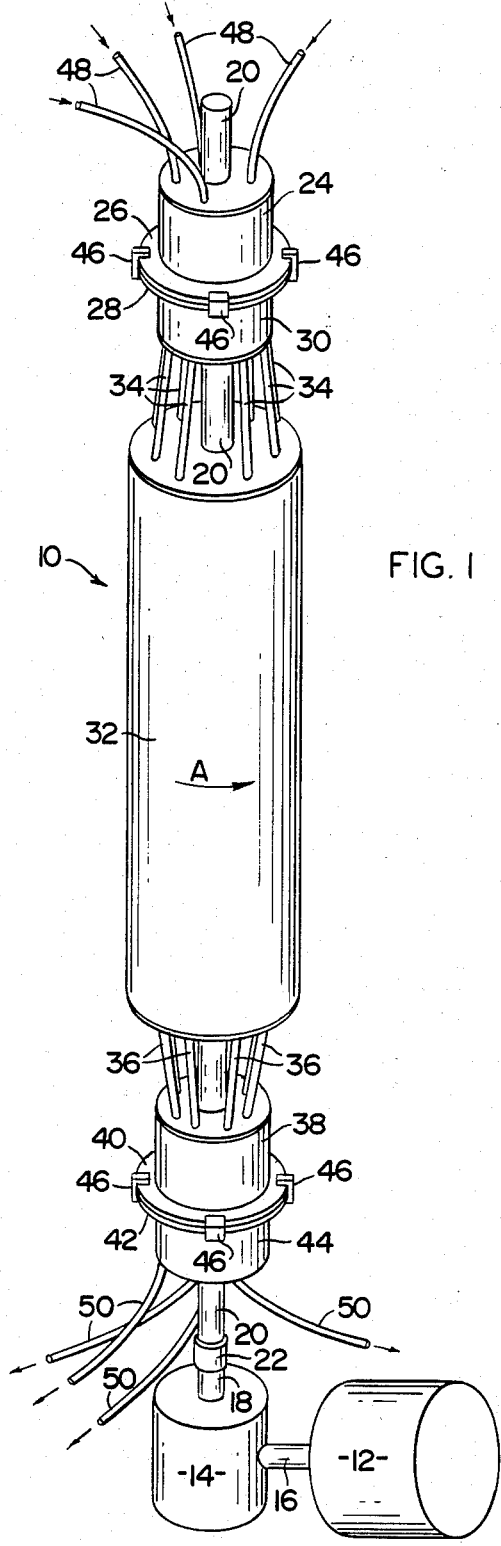
FIG. 1 is a perspective view of a preferred embodiment of the advanced separation device.

The advanced separation device of this invention is generally indicated as 10 in the perspective view of FIG. 1. As will be explained in greater detail below, advanced separation device 10, or at least portions thereof, are caused to rotate in the direction of arrow A by drive motor 12 and reducer 14. Motor 12 is connected to reducer 14 by shaft 16, and drive output shaft 18 extends from reducer 14. Also as shown in the representation of FIG. 1, drive output shaft 18 is connected to main drive shaft 20 by coupling means 22. It is, however, to be understood that other means may be utilized for causing rotation of device 10. For example, and not by way of limitation, one might choose to utilize circumferential drives or gear-type drives rather than the shaft-type drive illustrated in this embodiment. The scope of this invention is not to be limited by any specific construction for the drive means.

Still with reference to the view of FIG. 1, it can be seen that the advanced separation device of this invention comprises a feed box 24 having an upper timing crown 26 fixed to the downstream side thereof. An upper distribution crown 28 is movably disposed in juxtaposition downstream of the upper timing crown 26, and is fixed to the top of a distribution box 30.

Disposed downstream of distribution box 30 is separator body 32, and separator body 32 is in fluid communicating relation with distribution box 30 by virtue of the plurality of upper conduits 34. Downstream of separator body 32 are a plurality of lower conduits 36 which connect separator body 32 in fluid communicating relation to collection box 38. A lower distribution crown 40 is fixed to the downstream side of collection box 38 and is movably disposed in juxtaposition to lower timing crown 42. Fixedly attached to the downstream side of lower timing crown 42 is discharge box 44.

It can also be seen that a plurality of clamps 46 are utilized to maintain the relative positions of upper timing crown 26 to upper distribution crown 28 and of lower distribution crown 40 to lower timing crown 42. It is to be understood that other mechanical equivalents for clamps 46 might be utilized, and the scope of this invention is not to be limited in this regard. All that is necessary is that clamp means 46, or their mechanical equivalents, maintain the relative position of the juxtaposed structural elements while permitting rotation of the upper distribution crown 28 and the lower distribution crown 40 as well as all structural elements interposed therebetween with respect to the remainder of device 10. It has also been found to be desirable to provide the abutting surfaces of upper timing crown 26 and upper distribution crown 28 as well as those corresponding surfaces of lower distribution crown 40 and lower timing crown 42 with means to reduce friction and wear therebetween. For example, these abutting surfaces may be coated with teflon or may be provided with friction-reducing wear seals. Of course, inasmuch as upper distribution crown 28, lower distribution crown 40, and all structural elements therebetween rotate, those elements are disposed in driven relation to main drive shaft 20 by appropriate mechanical means which are within the knowledge of a person skilled in the art. Similarly, since feed box 24, upper timing crown 26, lower timing crown 42 and discharge box 44 are stationary, they are not connected in driven relation to main drive shaft 20. Just as obviously, a support structure or frame for the advanced separation device 10 would be required, but it is not illustrated for the reason that the support structure, per se, does not fall within the scope of this invention.

Figure 2:
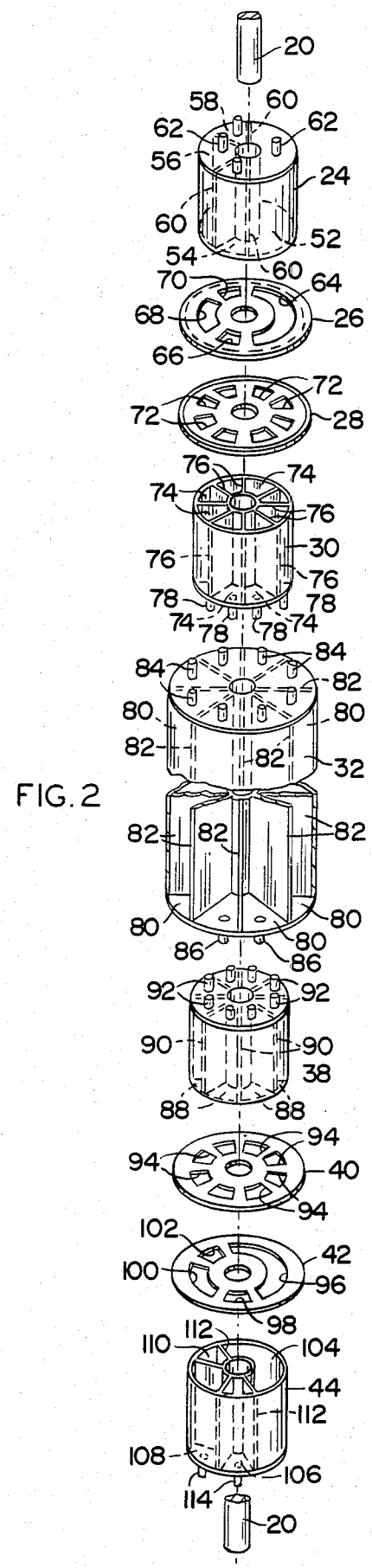
FIG. 2 is an exploded view of the device shown in FIG. 1, partially in section to illustrate interior detail.

Finally, with particular regard to the view of FIG. 1, a plurality of inlet conduits 48 are provided at the top of feed box 24 for the purpose of introducing fluid streams into device 10 for treatment, and a corresponding plurality of outlet conduits 50 are provided at the bottom of discharge box 44 for removing treated fluid streams. While device 10 is illustrated as comprising four inlet conduits 48 and four outlet conduits 50, as will be set forth in greater detail below, the scope of this invention is not to be limited to precisely four inlet streams and four outlet streams. Having thus set forth a preferred general construction for the advanced separation device 10, attention is now invited to the exploded view of FIG. 2 for a further detailed description of the individual structural elements.

Feed box 24 is of generally cylindrical configuration the interior of which defines four feed box sections 52, 54, 56 and 58. These feed box sections 52–58 are each defined by the walls of feed box 24 and feed box partitions 60. An inlet nipple 62 is in fluid communicating relation to each of the feed box sections, and the bottom of each feed box section is open. The inlet conduits 48 shown in the view of FIG. 1 are connected, respectively, to a corresponding one of the inlet nipples 62.

Fixed to the bottom of feed box 24 is upper timing crown 26. As clearly seen in the view of FIG. 2, upper timing crown 26 comprises a plurality of feed slots 64, 66, 68 and 70 formed therethrough in corresponding fluid communicating relation to feed box sections 52, 54, 56 and 58, respectively.

Movably disposed downstream of the upper timing crown 26 is upper distribution crown 28. As depicted in this preferred embodiment, upper distribution crown 28 comprises a plurality of upper distribution slots 72 formed therethrough. Because upper distribution crown 28 is fixed to main drive shaft 20 for rotation, it can be seen that at least one of the upper distribution slots 72 will be disposable into fluid communicating relation with at least one of the feed slots 64-70. The distribution box 30 is fixed to the downstream side of upper distribution crown 28 and defines a plurality of distribution compartments 74 each one of which is in fluid communicating relation to a corresponding upper distribution slot 72. In a fashion similar to that for the construction of feed box 24, the distribution compartments 74 are defined by distribution box partitions 76. Extending from the downstream side of distribution box 30, and in fluid communicating relation with each of the distribution compartments 74 is an outlet nipple 78.

The separator body 32 is also of generally cylindrical configuration and defines a pluraity of working compartments 80, each one of which corresponds to one of the distribution compartments 74. The working compartments 80 are defined, in part, by separator body partitions 82. A plurality of receiving nipples 84 are provided at the top of separator body 32 such that each one of the receiving nipples 84 is in fluid communicating relation to a corresponding one of the working compartments 80. Corresponding discharge nipples 86 are provided at the bottom of separator body 32. At this point it should be noted that upper conduits 34 are operatively disposed between corresponding pairs of receiving nipples 84 and outlet nipples 78 so as to permit the transfer of fluid from distribution box 30 to separator body 32.

Disposed downstream of separator body 32 is the collection box 38, the construction of which is a substantial mirror image of distribution box 30. Accordingly, collection box 38 defines a plurality of collection compartments 88 therein, each one of which is at least partially defined by collection box partitions 90. A plurality of collection nipples 92 are provided at the top of collection box 38 such that each one of the nipples 92 is in fluid communicating relation to a corresponding one of the collection compartments 88. Referring to the view of FIG. 1, discharge nipples 86 are connected in fluid communicating relation to a corresponding one of the collection nipples 92 by lower conduits 36.

Just as the collection box 38 is a substantial mirror image of the distribution box 30, so are the lower distribution crown 40, the lower timing crown 42 and the discharge box 44 substantial mirror images of the upper distribution crown 28, the upper timing crown 26 and the feed box 24, respectively. The lower distribution crown 40 is fixed to the downstream end of collection box 38 and comprises a plurality of lower distribution slots 94 formed therethrough, each one of said plurality of lower distribution slots 94 being in fluid communicating relation to a corresponding one of the collection compartments 88. The lower timing crown 42 similarly comprises lower discharge slots 96, 98, 100 and 102 formed therethrough whereby at least one of said discharge slots 96-102 is disposable into fluid communicating relation with at least one of said lower distribution slots 94.

The discharge box 44 is fixed to the downstream side of lower timing crown 42 and is defined by a plurality of discharge sections 104, 106, 108 and 110 defined by the walls of discharge box 44 and discharge box partition 112. Finally, each of the discharge sections 104-110 is provided with a discharge nipple 114 from which treated fluid may be withdrawn as through outlet conduits 50 shown in the view of FIG. 1.

It is again to be emphasized that the advanced separation device 10 shown in the drawings and described hereinabove is presented as a preferred embodiment so as to enable any person skilled in this art to make and use the device. Any terminology or description pertaining to direction of rotation or direction of fluid flow through device 10 is presented for example only, and not as a structural limitation to the scope of the invention. Rotation of separator body 32 may be either clockwise or counterclockwise, and fluid flow through device 10 may be entirely from top to bottom as illustrated, or may be varied in accord with the requirements of the process actually being conducted. Furthermore, because device 10 is provided with plural inlets, plural outlets and a plurality of compartments for the purpose of treating fluids, one series of compartments may be utilized for process operation while another one or more of the compartments is being simultaneously purged, regenerated, or otherwise renewed. Thus, the number of input and output streams may be varied to suit particular process applications, and the number of working compartments may be varied to suit the physical and chemical properties of the media contained therein and of the streams being processed. It is also to be understood that the capacity of the various elements as well as nipple sizes and conduit sizes may be adjusted to suit capacities required for specific processes and applications. Sealing arrangements between the upper timing crown 26 and the upper distribution crown 28 as well as between the lower distribution crown 40 and the lower timing crown 42 may consist of O rings and/or strips of carbon, teflon or other such material, depending upon the nature of the fluids being processed. Working compartments 80 of the separator body 32 are filled with ion exchange resin, or other suitable media to effect the desired separation or filtration. Porous plate, filter cloth or screen would normally be placed in the top and bottom of each working compartment 80 to prevent outflow of the separator media. Other material such as, for example, glass beads may be used as further support for the resin.

The effect of the rotation of those elements of the device 10 defined at each end by upper distribution crown 28 and lower distribution crown 40 is to distribute the input solutions, slurries or gasses, in turn, to the various working compartments 80 of separator body 32. The rotational speed of device 10 will be determined by the nature of the process fluids, the separation media contained within separator body 32, and the pressure drop through the device. The use of higher levels of pressurization will speed fluid flow and permit device 10 to be rotated at an increased speed relative to a low or ambient pressurization. It is contemplated that the advanced separation device 10 will normally rotate in the range of 1 to 30 rotations per hour; however, wider ranges of rotational speed are possible depending upon process conditions. Thus, it can clearly be seen that the advanced separation device 10 of this invention provides a truly continuous separation operation since all process fluids, as well as purging fluids, may be fed and extracted continuously.

It can thus be seen that the advanced separation device of this invention makes possible a unique, truly continuous method for treating plural fluid streams. While ion exchange techniques might be considered as a primary example of an end use application for device 10, its use can clearly be extended into several other areas including, but certainly not limited to, sand bed filtration, molecular sieve separation, removal of organic material from process fluids, gas separation and/or concentration, catalytic reactions, resin-in-pulp, activated carbon treatment, impregnated substrates, and membrane electrodialysis. The continuous nature of the treatment method provided by device 10 allows many process arrangements which would not be economically feasible with fixed bed or pulsed bed devices. Also because of its continuous treatment method, the advanced separation device 10 provides near steady state profiles resulting in "rough-cut" or quasi-chromatographic separations. Such separations would be ideal as a pretreatment for further refining operations to a particular process fluid while the broad utility projected for the advanced separation device 10 is only now being explored, it is anticipated that the device and the method for effecting continuous treatment of plural fluid streams will demonstrate actual economic utility in a variety of process applications such as, for example, sequential absorption/desorption of oxygen from air utilizing an activated carbon substrate to produce a final air product containing a significantly higher percentage of oxygen than normally encountered in the atmosphere; production of potassium phosphate from monocalcium phosphate; production of potassium nitrate from potash and nitrate salts; recovery of flourine from pond water; removal of iron from chloride solutions; recovery of various metals from conventional leach liquors; processes involving advanced biological applications such as immobilized enzymes; water desalinization; and even complete water treatment systems.

It will thus be seen that the objects set forth above, among those made apparent from the preceding description, are efficiently attained and, since certain changes may be made in the construction and in carrying out the above method without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An advanced separation device for the treatment of a fluid stream, said device comprising: a feed box defining a plurality of feed box sections and including means for introducing a fluid stream into each one of said feed box sections; an upper timing crown fixed to said feed box downstream of said means for introducing and comprising a plurality of feed slots formed therethrough, each one of said feed slots being in fluid communicating relation to a corresponding one of said feed box sections; an upper distribution crown movably disposed in substantially congruent relation to said upper timing crown and downstream thereof, said upper distribution crown comprising a plurality of upper distribution slots formed therethrough, at least one of said plurality of feed slots being disposable into fluid communicating relation with at least one of said upper distribution slots; a distribution box defining a plurality of distribution compartments fixed to said upper distribution crown downstream thereof whereby each one of said distribution compartments is in fluid communicating relation to a corresponding one of said upper distribution slots, said distribution box further comprising an outlet means for each of said distribution compartments downstream of said upper distribution crown; a separator body defining a plurality of working compartments and including means for receiving a fluid stream into each one of said working compartments, said separator body being disposed downstream of said distribution box and each one of said means for receiving being connected in fluid communicating relation to a corresponding one of said outlet means, said separator body further comprising a discharge means for each of said working compartments downstream of said means for receiving; a collection box defining a plurality of collection compartments and including means for collecting a fluid stream into each one of said collection compartments, said collection box being disposed downstream of said separator body and each of said means for collecting being disposed in fluid communicating relation to a corresponding one of said discharge means; a lower distribution crown fixed to said collection box downstream of said means for collecting and comprising a plurality of lower distribution slots formed therethrough, each one of said lower distribution slots being in fluid communicating relation to a corresponding one of said collection compartments; a lower timing crown disposed downstream of said lower distribution crown in substantially congruent, immobile relation thereto and comprising a plurality of discharge slots formed therethrough, at least one of said plurality of discharge slots being in fluid communicating relation to at least one of said lower distribution slots; a discharge box defining a plurality of discharge sections fixed to said lower timing crown downstream of said lower distribution crown whereby each one of said discharge sections is in fluid communicating relation to a corresponding one of said discharge slots, said discharge box further comprising means for withdrawing a treated fluid stream from each one of said discharge sections; and drive means operatively connected to said device whereby said upper distribution crown, said distribution box, said separator body, said collection box and said lower distribution crown may be rotated with respect to said feed box and said upper timing crown and with respect to said lower timing crown and said discharge box.

2. An advanced separation device for the treatment of a fluid stream, said device comprising: a feed box defined by an exterior wall, a closed top and a plurality of vertical feed box partitions disposed within said feed box whereby a plurality of feed box sections are defined, said feed box further comprising a plurality of inlet nipples formed through said top and extending outwardly therefrom whereby a fluid stream may be introduced into said device, each one of said nipples being in fluid communicating relation to a corresponding one of said feed box sections; an upper timing crown fixed to said feed box in opposed relation to said top, said upper timing crown comprising a plurality of feed slots formed therethrough, each one of said feed slots being in fluid communicating relation to a corresponding one of said feed box sections; an upper distribution crown movably disposed in substantially congruent relation to said upper timing crown, said upper distribution crown comprising a plurality of upper distribution slots formed therethrough, at least one of said plurality of upper distribution slots being disposable into fluid communicating relation with at least one of said feed slots; a distribution box defined by an exterior wall, a closed bottom and a plurality of vertical distribution box partitions disposed within said distribution box whereby a plurality of distribution compartments are defined, said distribution box being fixed to said upper distribution crown whereby each of said distribution compartments is in fluid communicating relation to a corresponding one of said upper distribution slots, said distribution box further comprising a plurality of outlet nipples formed through said closed bottom and extending outwardly therefrom, each one of said outlet nipples being in fluid communicating relation to a corresponding one of said distribution compartments; a separator body defined by an exterior wall, a closed top, a closed bottom and a plurality of vertical separator portions disposed within said separator wall and extending between said separator top and bottom whereby a plurality of working compartments are defined, said separator body further comprising a plurality of receiving nipples formed through said separator top and extending outwardly therefrom in fluid communicating relation to a corresponding one of said working compartments, each one of said receiving nipples being connected in fluid communicating relation to a corresponding one of said outlet nipples, and said separator body further comprising a plurality of discharge nipples formed through said separator bottom and extending outwardly therefrom, each one of said discharge nipples being in fluid communicating relation to a corresponding one of said working compartments; a collection box defined by an exterior wall, a closed top and a plurality of vertical collection box partitions disposed within said collection box whereby a plurality of collection compartments are defined, said collection box further comprising a plurality of collection nipples formed through said collection box top and extending outwardly therefrom in fluid communicating relation to a corresponding one of said collection compartments, each one of said collection nipples being connected in fluid communicating relation to a corresponding one of said discharge nipples; a lower distribution crown fixed to said collection box in opposed relation to said collection box top, said lower distribution crown comprising a plurality of lower distribution slots formed therethrough, each one of said lower distribution slots being in fluid communicating relation to a corresponding one of said collection compartments; a lower timing crown disposed in substantially congruent relation to said lower distribution crown, and immobile with respect thereto, said lower timing crown comprising a plurality of discharge slots formed therethrough, at least one of said plurality of said discharge slots being in fluid communicating relation to at least one of said lower distribution slots; a discharge box fixed to said lower timing crown in opposed relation to said lower distribution crown and defined by an exterior wall, a closed bottom and a plurality of vertical discharge box partitions disposed within said discharge box whereby a plurality of discharge sections are defined, said discharge box further comprising a plurality of discharge nipples formed through said discharge box bottom and extending outwardly therefrom, each one of said plurality of discharge nipples being in fluid communication relation to a corresponding one of said discharge sections whereby a treated fluid stream may be withdrawn; and drive means operatively connected to said device whereby said upper distribution crown, said distribution box, said separator body, said collection box and said lower distribution crown may be rotated with respect to said feed box and said upper timing crown and with respect to said lower timing crown and said discharge box.

3. A method for effecting continuous treatment of plural fluid streams, said method comprising the steps of:
   a. introducing a first stream of fluid into the first treatment section of a separator body;
   b. withdrawing the resulting treated first stream from said first treatment section;
   c. rotating said separator body to permit introduction of a second fluid stream into said first treatment section;
   d. introducing said first treated stream into a second treatment section of said separator body;
   e. withdrawing the resulting second treated first stream from said second treatment section;
   f. withdrawing the resulting treated second stream from said first treatment section;
   g. rotating said separator body to permit introduction of said treated second stream into said second treatment sections; and
   h. withdrawing the resulting second treated second stream from said second treatment section.

* * * * *